United States Patent [19]

Overbay et al.

[11] Patent Number: 5,156,481
[45] Date of Patent: Oct. 20, 1992

[54] QUICK CONNECTION MATING PART COUPLER

[75] Inventors: Mark A. Overbay, East Ridge; Samuel B. Crabtree, Chattanooga, both of Tenn.

[73] Assignee: Combustion Engineering, Inc., Windsor, Conn.

[21] Appl. No.: 453,748

[22] Filed: Dec. 20, 1989

[51] Int. Cl.⁵ .................................................. B25G 3/00
[52] U.S. Cl. ........................................ 403/14; 403/24; 403/317; 403/322; 901/28; 901/30; 411/348
[58] Field of Search ............... 403/322, 317, 326, 24, 403/14, DIG. 6; 901/28, 29, 30, 41; 411/348

[56] References Cited

U.S. PATENT DOCUMENTS 4,120,232 10/1978 Hoffman, Jr. .................. 411/348 X
4,652,203 3/1987 Nakashima et al. .............. 901/30 X Primary Examiner—Andrew V. Kundrat
Attorney, Agent, or Firm—John H. Mulholland

[57] ABSTRACT

A coupler body 12 with a socket 44 therein is attached to nuclear stream generator tools to be mated with an arm 22 of a remotely controlled manipulator. A plug 16 for insertion in socket 44 is mounted with a ball detent lock actuating air cylinder 18 on L-shaped bracket 20 attached to the end of arm 22. Cam surfaces 62 on body 12 and 64 on bracket 20 align the plug 16 and socket 44 for insertion to mate and couple the tools and arm 22.

7 Claims, 3 Drawing Sheets

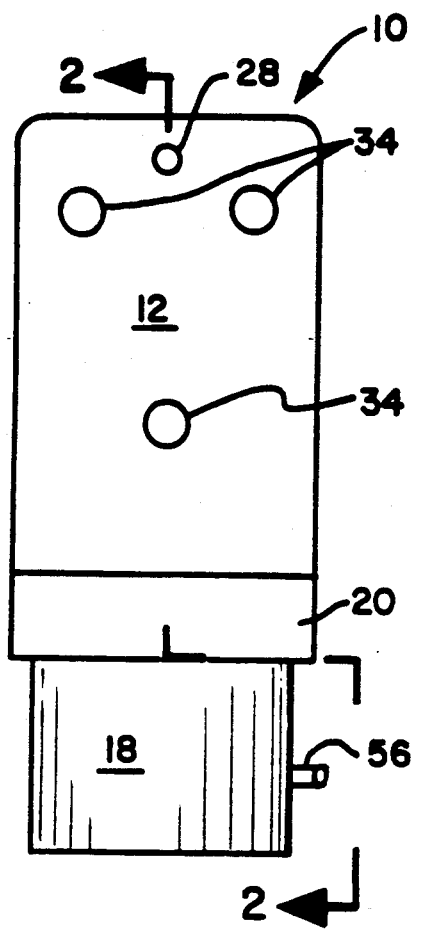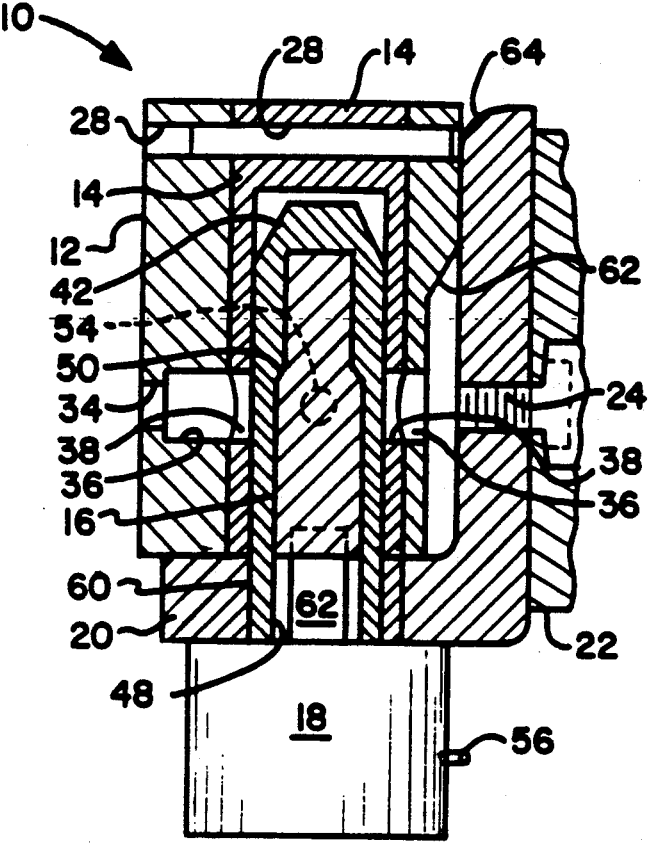
Fig. 1
Fig. 2
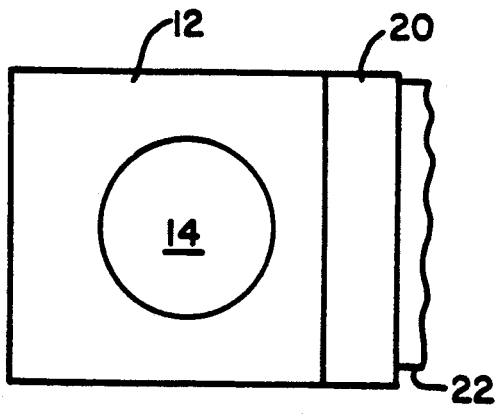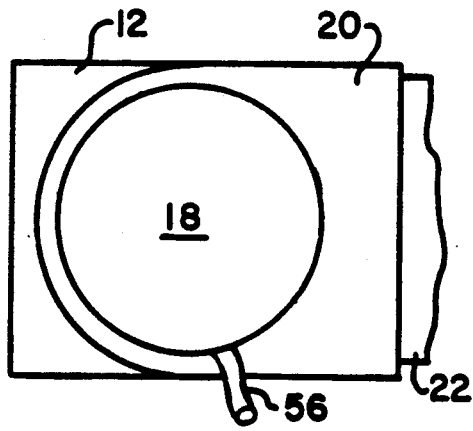
Fig. 3
Fig. 4

QUICK CONNECTION MATING PART COUPLER

FIELD OF THE INVENTION

The present invention relates to an improvement in an equipment coupler for attaching and detaching tools (end effectors) to and from a manipulator, and more particularly, the arm of a post and arm manipulator (robot) used in a hazardous environment (ionizing radiation) to minimize human risk and to maximize productivity.

BACKGROUND OF THE INVENTION

The maintenance and repair of nuclear steam supply system steam generators often involves operations such as machining (EDM), removing, plugging, sleeving, rolling and welding of portions of the steam generator U-shaped tubes from the primary side of the tubesheet. These operations typically expose one or more operators to radiation in a manner which may be hazardous to their health.

To conduct maintenance and repair operations in a steam generator with a minimum of ionizing radiation exposure to the operators, post with cantilevered arm manipulators have been used to move end effectors (tools and sensors) into operative position under the tubesheet in the primary chamber. The manipulators and tools are put in and removed from the steam generators by the operators and the manipulators are used to move the tools during operations on the tubes. Some systems have been devised to minimize the time operators must be physically in the steam generators. These, typically, permit attaching and detaching the tools on the manipulating arm from a platform adjacent the access opening of the steam generator and using the arm to move the tool to and from the working position on the primary side of the tubesheet.

In the past, the most common method of attaching and detaching the tools has been by mounting two mating "dovetailed" pieces, one mechanically fastened on the end and one fastened on the tool, with a manually operated spring-biased lock to hold them together.

SUMMARY OF THE INVENTION

The present invention provides an improved equipment coupler for attaching and detaching tools to and from a manipulator arm by remote control. The advantage of this system is that it provides quick and remote connection and disconnection of the tools to minimize operator exposure. In fact, a system may be set up such that the tools can be initially placed in the steam generator in such manner that the arm easily can access them, perhaps by suitable storage racks or tubesheet mounted supports. The remote quick connection system of the invention can be utilized to minimize operator exposure either by use of such a system, or otherwise.

According to the principals of the invention, the tools to be mated to the arm have attached thereto one part of the mating part coupler and the arm to be mated to the tools has attached thereto the other part of the mating part coupler. One of the coupler parts includes a plug and the other of the coupler parts includes a socket. The two coupler parts may be locked by a cammed ball detent, thus locking the mating tools and arm in coupled relation.

One of the mating parts coupler parts is a coupler body. It is designed to be mechanically attached, by fasteners or an intermediate conventional dovetail connection, to a first of the two mating parts to be connected, either one of the tools or the arm. The coupler body is assembled with, and accordingly includes, a sleeve to define an elongated socket and detent ball recess.

An elongated coupler plug of complimentary shape and size to that of the socket, with a radially movable ball and axially movable cam surface for moving the ball therein, is provided for insertion into the socket. The ball is provided for movement into and out of locking position in the detent ball recess of the coupler body to lock the plug in the socket when the cam is in one axial position and to permit insertion or removal of the plug when the cam is in another axial position.

The elongated plug has a tapered lead-in surface and is mounted on a bracket member with an pneumatic actuator for axially reciprocating the movable cam surface for locked attachment of the mating parts. The bracket includes a bracket cam surface portion for cooperation with the coupler body during attachment.

The coupler body has a cam surface on its outer surface opposite to its attachment to one of the mating parts. This cam surface and the bracket cam surface cooperate in spacing and aligning the coupler parts for assembly of the plug into the socket as they move from disconnected to connected position.

BRIEF DESCRIPTION OF THE DRAWINGS

FIG. 1 is an elevational view of the mating part coupler constructed according to the principals of the invention including a coupler body and coupler bracket for attached and detaching tools to and from a manipulator arm by remote control;

FIG. 2 is a partially schematic cross-sectional view taken along the line 2—2 of FIG. 1 with a fragment of the manipulator arm or a dovetailed adapter mounted on the manipulator arm shown attached to the coupler bracket;

FIG. 3 is a top plan view of the structure of FIGS. 1 and 2;

FIG. 4 is a bottom view of the structure of FIGS. 1 and 2;

DESCRIPTION OF THE PREFERRED EMBODIMENT

Figure 5:
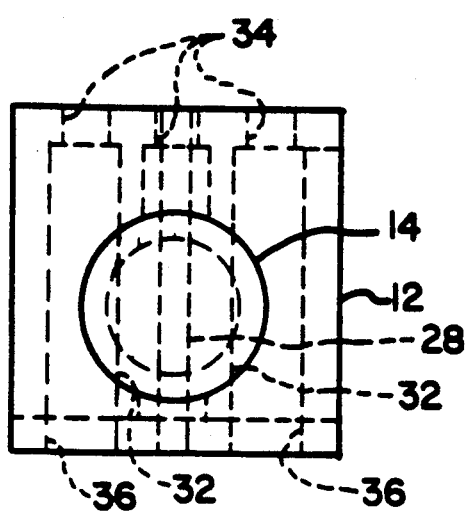
FIG. 5 is a top plan view of the coupler body of FIGS. 1–4 including a socket and recess defining sleeve assembled therein.
Figure 7:
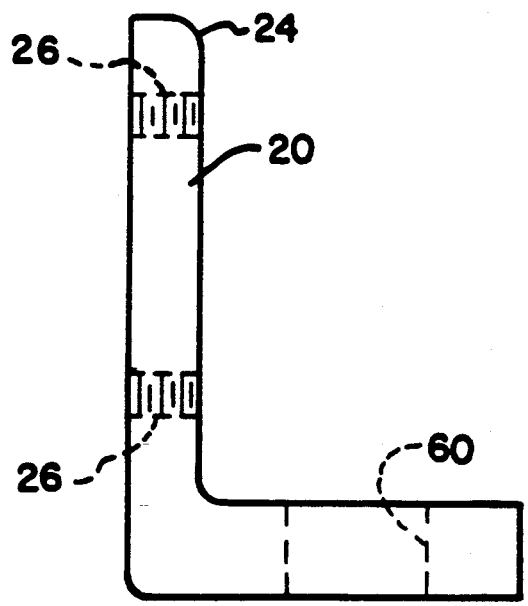
FIG. 7 is a rear elevational view of the bracket of the coupler body as oriented in FIG. 2.
Figure 6:
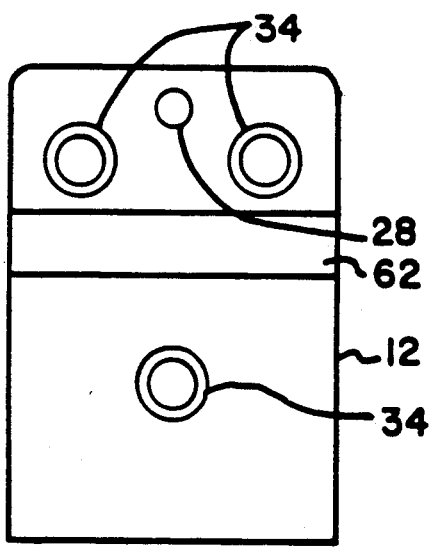
FIG. 6 is an elevational view of the right side of the coupler body as oriented in FIG. 2, including the coupler body cam surface.
Figure 8:
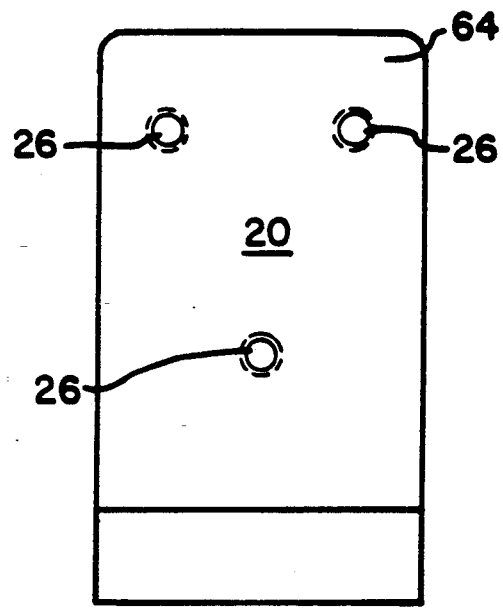
FIG. 8 is an elevational view of the left side of the coupler bracket as oriented in FIG. 2.
Figure 9:
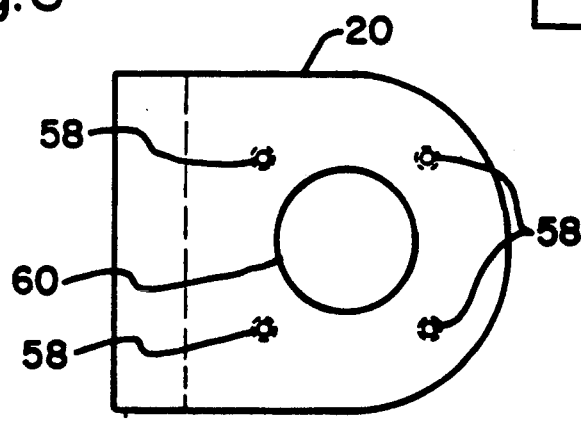
FIG. 9 is a bottom view of the coupler bracket showing the holes for mounting the air cylinder actuator.

The numeral 10 generally designates the mating part coupler for attaching and detaching tools to and from a manipulator arm by remote control, according to the principals of the invention and FIGS. 1 to 14. In use, the tools preferably have attached thereto a coupler body 12 or a dovetailed adapter (not shown) attached to body 12.

The coupler body 12 includes a hollow cylindrical socket sleeve 14 for receipt of an elongated coupler plug 16. Plug 16 is mounted with an actuator 18 on a generally L-shaped bracket 20 fastened to a manipulator arm 22, or a dovetailed adapter 22 on the manipulator arm end, as is appropriate. Threaded fasteners 24 in threaded holes 26 supply the fastening means.

Figure 10:
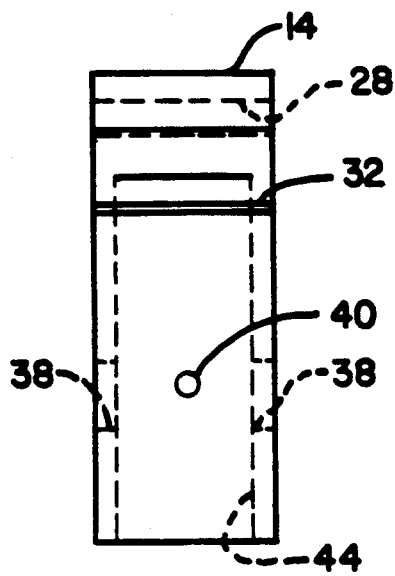
FIG. 10 is a front elevational view of the coupler body socket sleeve as oriented in FIG. 2.
Figure 11:
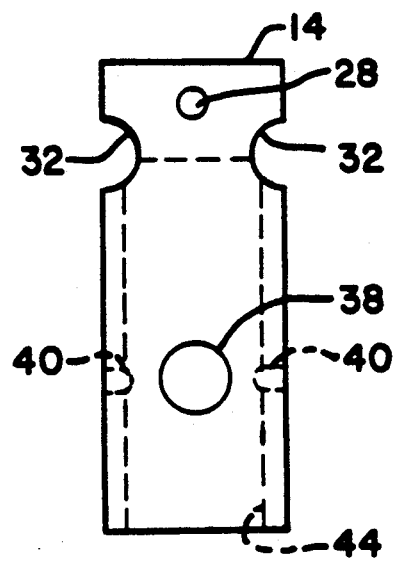
FIG. 11 is a side elevational view of the sleeve of FIG. 10.
Figure 12:
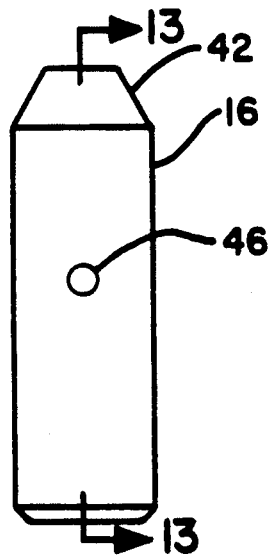
FIG. 12 is a view similar to FIG. 10 of the plug for mounting on the coupler bracket and inserting in the coupler body socket sleeve of FIGS. 10 and 11.
Figure 13:
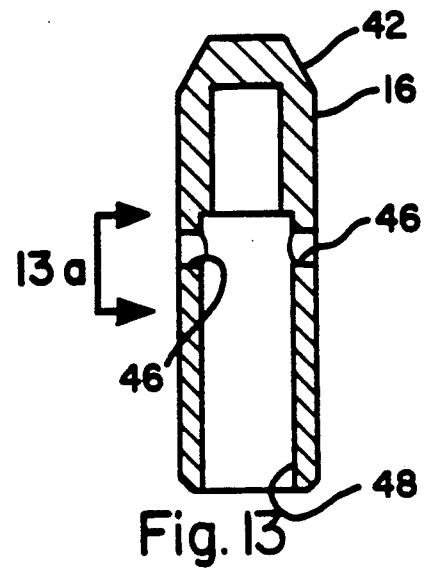
FIG. 13 is a cross-sectional elevational view taken along the line 13—13 of FIG. 12.
Figure 14:
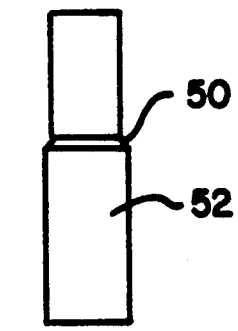
FIG. 14 is a front elevational view of the axially movable cam surface member for actuation by the air cylinder actuator to lock and unlock the coupler.
Figure 13A:
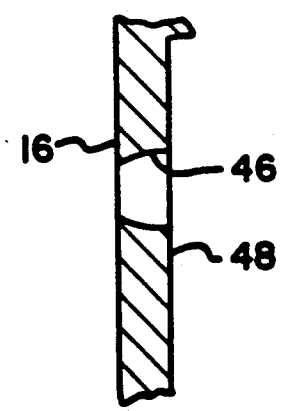
FIG. 13a is a fragmentary portion of FIG. 13 between the ends of line 13a enlarged for clarity.

The sleeve 14 is secured by a hole 28 through coupler body 12 and sleeve 14 with a spring pin 30 mounted therein. As seen in FIGS. 5, 10, and 11, the sleeve 14 has fastener clearance radii 32 which align with fastener openings 34 at the upper end of coupler body 12, above and symmetrically spaced from a lower fastener opening 34. Access to the openings 34 are through the larger diameter openings 36 in body 12 opposite and coaxial with openings 34. The fastener for lower opening 34 passes through openings 38 of the sleeve 14. The fasteners in openings 34 preferably go directly into suitably threaded openings in the tools (not shown) which become one of the mating parts with the arm 22. The bodies 12, once attached to the tool, stay with the tool or dovetailed adapter attached thereto. The sleeve 14 has ball detent recesses 40 arranged at 90° from the openings 38 to effect a lock with the plug 16 in a manner to be described below.

The plug 16 has a tapered lead-in end 42 for ease of insertion into the socket 44 defined by the hollow of sleeve 14. Ball detent recesses 40 are in communication with the socket 44 and have balls captured in the radially communicated recesses 40 and recesses 46 in the wall of plug 16 which defines a bore 48 for receipt of axially movable body cam surface 50 member 52. The cam surface 50 radially drives a detent ball 54 into the recesses 40 and 46 from a more radially central position above the cam surface 50 and between the axially movable cam surface body 52 and the wall of bore 48. This driven movement of the detent ball occurs because air cylinder actuator 18 selectively actuates member 52 with cam surface 50 in response to safely remote pneumatic control action through air line 56. The actuation creates selective reciprocation of member 52 to permit the cam surface 50 to cam the ball 54 radially when the movement is upward and to permit the ball 54 to radially move inwardly for disassembly of the plug 16 from socket 44 when the movement is downward.

Dimensional relations to permit this action may be proportional to the following:
recess 40=0.16" dia. through
recess 46=0.194" dia. at bore
ball 54=0.188" dia. overall The actuator 18 is mounted by means of threaded holes 58 in the base of bracket 20 and its movable member 62 is suitably fastened to member 52, as by a threaded connection (not shown), for movement in bore 48. Plug 16 is welded to bracket 20 adjacent member 62 in a bore 60 of the bracket.

In coupling the mating parts, the tool, with a coupler body 12 thereon, is approached by manipulator arm 22 from below and the right side as seen in FIG. 2. A cam surface 62 on coupler body 12 engages a cam surface 64 to align plug 16 and socket 44 as they move from disconnected to connected positions. The tool is thus coupled to the mating part, arm 22, and the actuator 18 remotely actuated to lock the plug 16 in socket 14 with ball detent 54. A suitable actuator 18 for this purpose is a "FLAT-1" brand, manufactured by Bimba Manufacturing of Monee, Ill. 60449, as Model No. FOR-04-0.375-3V.

Thus, it will be seen that a mating part coupler for attaching and detaching tools to and from manipulator arm by remote control with reduced radiation exposure to maintenance personnel is provided.

We claim:

1. A mating part coupler for attaching and detaching tools to and from a manipulator arm by remote control in which the tools have attached thereto one part of the mating parts coupler and the arm has attached thereto the other part of the mating parts coupler and where one of the coupler parts includes a plug and the other of the coupler parts includes a socket and the two may be locked by a cammed ball detent, the improvement comprising:

a coupler body attached to one of the mating parts and defining an elongated socket and detent ball recess;

an elongated coupler plug, of complimentary shape and size to that of the socket, with a radially movable ball and axially movable cam surface for moving the ball therein;

said plug for insertion into the socket and said ball for movement into and out of locking position in said detent ball recess to lock said plug in said socket when said cam is in one axial position and to permit insertion or removal of said plug when said cam is in another axial position;

said body defining said elongated socket having a body cam surface on an outer surface thereof opposite its attachment to one of said mating parts;

said elongated plug being mounted with an actuator for axially reciprocating said movable cam surface on a bracket member for attachment to the other of said mating parts;

said bracket including a bracket cam surface portion for cooperation with said body cam surface to align said plug and socket as they move from disconnected to connected positions.

2. The mating part coupler of claim 1 in which the bracket is attached to the arm.

3. The mating part coupler of claim 2 in which the bracket is attached to the arm by virtue of being fastened to a conventional dovetail member.

4. The mating part coupler of claim 1 in which the coupler body socket is defined by a sleeve secured in a bore in said body.

5. The mating part coupler of claim 4 in which the sleeve has said detent ball recess therein.

6. The mating part coupler of claim 1 in which a plurality of detent ball recesses and detent balls are provided.

7. The mating part coupler of claim 1 in which the plug has a tapered lead-in surface to center plug in the socket.

* * * * *